United States Patent [19]
Landin

[11] Patent Number: 5,830,319
[45] Date of Patent: Nov. 3, 1998

[54] FLEXIBLE FIRE BARRIER FELT

[75] Inventor: Heather V. Landin, Rush River Township, St. Croix County, Wis.

[73] Assignee: Minnesota Mining and Manufacturing, St. Paul, Minn.

[21] Appl. No.: 543,112

[22] Filed: Oct. 13, 1995

[51] Int. Cl.[6] .......................... C09K 21/00; D21H 27/00
[52] U.S. Cl. ................... 162/159; 106/18.14; 428/921
[58] Field of Search ................ 162/159; 106/15.05, 106/18.14; 252/601; 428/921, 283, 920

[56] References Cited

U.S. PATENT DOCUMENTS

| | | | |
|---|---|---|---|
| 4,168,175 | 9/1979 | Shutt | 106/15.05 |
| 4,273,879 | 6/1981 | Langer et al. | 521/91 |
| 4,277,532 | 7/1981 | Czepel et al. | 428/244 |
| 4,380,568 | 4/1983 | Masuda et al. | 428/276 |
| 4,433,020 | 2/1984 | Narukawa et al. | 428/113 |
| 4,443,517 | 4/1984 | Shah | 428/281 |
| 4,454,190 | 6/1984 | Katagiri | 421/281 |
| 4,467,577 | 8/1984 | Licht | 52/232 |
| 4,521,333 | 6/1985 | Graham et al. | 252/606 |
| 4,588,523 | 5/1986 | Tashlick et al. | 252/606 |
| 4,595,414 | 6/1986 | Shutt | 106/18.16 |
| 4,600,634 | 7/1986 | Langer | 428/220 |
| 4,879,320 | 11/1989 | Hastings | 523/179 |
| 4,945,015 | 7/1990 | Milner et al. | 523/179 |
| 5,103,609 | 4/1992 | Thoreson et al. | 52/232 |
| 5,175,197 | 12/1992 | Gestner et al. | 523/218 |
| 5,232,976 | 8/1993 | Horacek et al. | 524/495 |
| 5,384,188 | 1/1995 | Lebold et al. | 428/283 |

FOREIGN PATENT DOCUMENTS

| | | |
|---|---|---|
| A-281266 | 9/1988 | European Pat. Off. . |
| A-293531 | 12/1988 | European Pat. Off. . |
| 0 346 001 | 12/1989 | European Pat. Off. . |
| 508 751 A2 | 4/1992 | European Pat. Off. . |
| 2 271 362 | 4/1994 | United Kingdom . |
| WO-A-9424227 | 10/1994 | WIPO . |

OTHER PUBLICATIONS

"Standard Test Methods for Fire Tests of Building Construction and Materials," American Society for Testing and Materials, Philadelphia, PA, Designation E 119–88[53] [1].

"Standard Test Method for Cyclic Movement and Measuring the Minimum and Maximum Joint Widths of Architectural Joint Systems," American Society for Testing and Materials, Philadelphia, PA, Designation E 1399–91.

*Primary Examiner*—Stanley S. Silverman
*Assistant Examiner*—Dean T. Nguyen
*Attorney, Agent, or Firm*—Leland D. Schultz

[57] ABSTRACT

A flexible fire barrier felt is provided that includes an organic polymeric binder; a phosphorus-containing compound; organic fibers with pendant hydroxyl groups; and a heat absorbing compound.

16 Claims, 1 Drawing Sheet

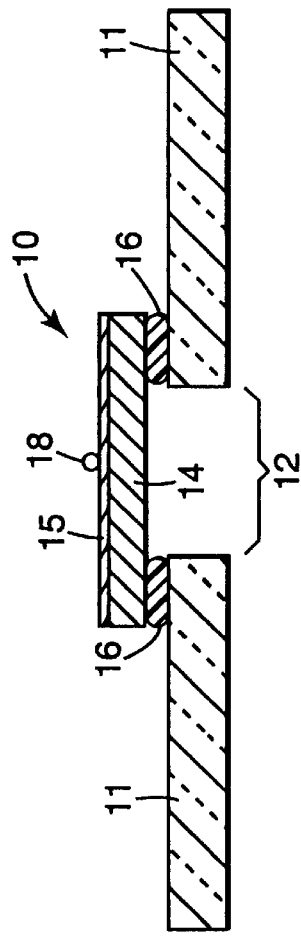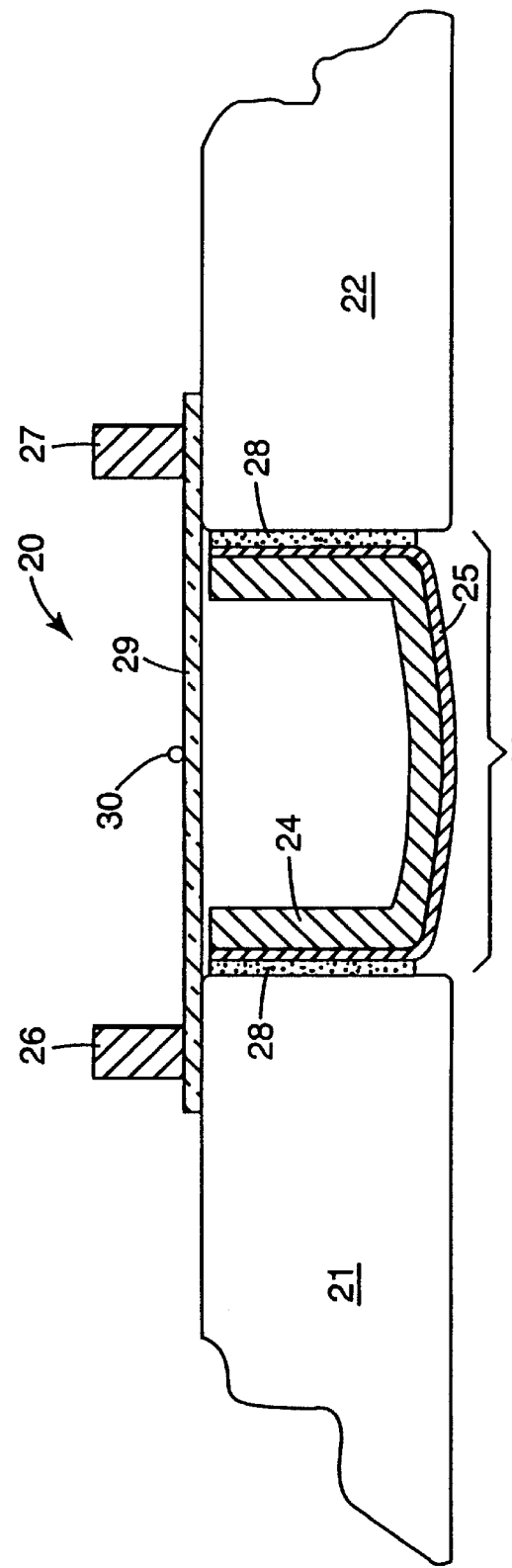

FLEXIBLE FIRE BARRIER FELT

FIELD OF THE INVENTION

This invention relates to a fire barrier felt that deters the spread of flames, smoke, vapors, and/or heat, during a fire.

BACKGROUND OF THE INVENTION

Fire barrier materials (often referred to as firestop materials or fire retardant materials) are used to reduce or eliminate the passage of smoke and flames through openings between walls and floors and the openings caused by through-penetrations in buildings, such as the voids left by burning or melting cable insulation resulting from a fire in modern office buildings. Characteristics of fire barrier materials suitable for typical commercial use include flexibility prior to exposure to heat, the ability to insulate and/or expand, and the ability to harden in place upon heating (i.e., to char) sufficiently to deter the passage of heat, smoke, flames, and/or vapors. Although many such materials are available, the industry has long sought better and more effective materials. For example, many commercially available materials protect for only limited periods of time because of poor stability at elevated temperatures or poor mechanical strength under high-pressure water sprays.

Foams, caulks, putty-like materials are known for use in various fire retardant applications. For example, urea formaldehyde resin foams are known to be used for filling gaps between concrete floor slabs and upright curtain walls. Such foams typically require some form of support (e.g., a thin sheet of metal) because the mechanical strength of foams is typically relatively low, and that of a charred foam is generally even lower. Intumescent compounds (e.g., expandible graphite and hydrated metal silicate granules incoporating an oxy boron compound) have been used with polymeric binders to form caulks for use in filling narrow joints (e.g., less than about one inch), or small holes (less than about one inch in diameter). Such materials can also include crosslinking and/or fire retardent compounds (e.g., phosphates), thickeners (e.g., cellulose), and fillers (e.g., cellulosic fibers or inorganic fibers). These compositions, however, are typically flowable and therefore generally not capable of maintaining their shape prior to being charred without some type of support. That is, most of these compositions are generally not self-supporting.

Nonflowable (i.e., self-supporting), fire retardant compositions are known. For example, elastomeric sheets containing intumescent compounds are known for use in pipe wraps or cable tray wraps. Also, rigid boards containing polymeric foams in combination with alkali metal silicates are known for use as thermal insulating covers on surfaces such as walls, ceilings, doors, and the like. Such rigid foam boards, however, are typically coated with a protective layer of material to render them moisture resistant. More flexible, water resistant sheet materials are also known. For example, expandable ceramic insulating fiber felts are known for use in furnaces; however, if such felts are used in a nonenclosed space, such as a curtain wall or a wall penetration, heated and expanded, they will often crumble and fall out. Other conventional felts are used as fire barriers, but some of these are not very flexible, and most are not self-supporting at high temperatures.

Thus, what is needed are additional fire-barrier materials that can be used in a wide variety of applications, particularly applications that require a flexible self-supporting material that when exposed to heat, either expands and hardens or simply hardens into a more rigid self-supporting material that provides insulation properties.

SUMMARY OF THE INVENTION

The present invention provides a flexible fire barrier felt and a method of producing the fire barrier felt. The felt includes: at least about 10 weight percent (wt-%) of an organic polymeric binder; at least about 5 wt-% of organic fibers having pendant hydroxyl groups (preferably cellulosic fibers); and at least about 10 wt-% of a heat absorbing compound; wherein the felt contains at least about 0.3 wt-% of phosphorus, as provided by a phosphorus-containing compound. This phosphorus-containing compound can be the heat absorbing compound if the heat absorbing compound also contains phosphorus. Typically, however, the heat-absorbing compound does not contain phosphorus; that is, it is a non-phosphorus-containing compound. Thus, a phosphorus-containing compound that is distinct from the heat absorbing compound is used as the source of the phosphorus. All weight percentages used herein are on a dry weight basis and are based on the total weight of the felt.

The felt of the present invention is self-supporting, and when subjected to a temperature of at least about 350° C., the self-supporting felt forms a self-supporting char. This char will typically occupy the same volume as the original felt, or it will occupy a larger volume, depending on the type of heat absorbing compound the felt contains. If the char needs to occupy a larger volume than that of the original felt to be effective, the heat absorbing compound is an intumescent compound (i.e., a compound that expands upon exposure to heat). Preferred intumescent compounds are those selected from the group consisting of intercalated graphite, mica, perlite, vermiculite, hydrated sodium silicate, and combinations thereof. If the char will be effective if it occupies substantially the same volume as that of the original felt, the heat absorbing compound is an endothermic compound. Preferred endothermic compounds are those selected from the group consisting of alumina trihydrate, magnesium ammonium phosphate, zinc borate, magnesium hydroxide, gypsum, and combinations thereof.

In another aspect, the method of making the fire barrier felt comprises: preparing an aqueous suspension of an organic polymeric binder, organic fibers having pendant hydroxyl groups, a heat absorbing compound, and an optional phosphorus-containing compound; precipitating the binder, heat absorbing compound, and optional phosphorus-containing compound onto the organic fibers; casting the precipitated suspension onto a screen to form a felt; and drying the felt; wherein the dried felt comprises at least about 10 wt-% organic polymeric binder, at least about 5 wt-% organic fibers having pendant hydroxyl groups, and at least about 10 wt-% heat absorbing compound; wherein the felt contains at least about 0.3 wt-% phosphorus, as provided by a phosphorus-containing compound (which can be the heat absorbing compound, the optional phosphorus-containing compound, or both). Preferably, the step of preparing an aqueous suspension includes the steps of preparing a first aqueous suspension of the fibers; preparing a second aqueous suspension of the organic polymeric binder, heat absorbing compound, and optional phosphorus-containing compound; and combining the first and second aqueous suspensions.

The following terms are used herein:

"binder" refers to an organic polymeric material;

"cellulosic" refers to materials which are carbohydrate polymers typically derived from wood or cotton;

"char" is a carbonaceous residue formed upon heating the felt at a temperature of at least about 350° C., such as would be experienced when exposed to flames;

"char strength" is a measure of the ability of the carbonaceous residue ("char") to remain intact, i.e., the strength of the residue;

"felt" refers to a compressed, porous nonwoven material;

"flexible" refers to the drapability of the felt; a flexible felt is one that can be fitted into a construction joint and subjected to building movement (seismic, thermal, wind sway, etc.) without breaking or significantly cracking;

"heat absorbing compound" refers to a compound that reacts to create an insulating barrier;

"intumescent" refers to a material that expands to at least about two times its original volume upon heating at a temperature, typically above about 100° C.;

"inorganic fibers" refer to mineral wool, glass, glass-ceramic, or ceramic materials in the form of fibers;

"organic fibers" refer to natural or synthetic polymeric materials, such as cellulosic materials, in the form of fibers;

"rayon fiber" refers to an extruded cellulosic material in the form of fibers typically at least 0.63 cm long; and "self-supporting" means that the felt and the char formed from it has sufficient cohesive strength to support its own weight.

BRIEF DESCRIPTION OF THE DRAWINGS

FIG. 1 is a test set-up for determining the hotside/coldside test performance of a fire barrier felt of the present invention.

FIG. 2 is a test set-up for determining the performance of a fire barrier felt of the present invention as a heat barrier in a joint.

DETAILED DESCRIPTION

The present invention provides a flexible fire barrier felt and a method of producing this felt. The felt can be in a variety of shapes, such as a mat or a sheet, or a complex shape (e.g., a cup or a clamshell), which can be formed through vacuum forming processes. The flexible felt is also self-supporting. During a fire, the fire barrier felt forms a self-supporting char that has sufficient integrity to effectively seal against the passage of heat, smoke, flames, and/or vapors. The felt also effectively insulates against the transfer of heat. When used as a fire barrier, the felt prevents a rapid rise in the temperature on the cold side of the felt. The insulating characteristics of the felt are comparable to similar thicknesses of conventional insulating materials such as mineral wool and intumescent mats.

In addition to the amount and type of components chosen to prepare the felt, the flexibility of the felt depends on its thickness. For example, a 0.63 cm thick felt in the form of a mat can be easily wrapped around a pipe 5.08 cm in diameter without visible cracking or spalling. A thicker felt, such as that in the form of a 1.25 cm thick mat, however, will typically exhibit some visible cracking or spalling at the surface when wrapped around a small diameter object, such as a 2.5 cm diameter pipe. A thinner felt, in the form of a 0.16 cm thick mat will generally exhibit greater flexibility, and can be wrapped around a 0.63 cm diameter pipe without showing evidence of cracking or spalling. Thus, a flexible felt will retain its structural integrity after being bent or curved.

Once the felt is exposed to a temperature of at least about 350° C., such as would result from exposure to flames in a fire, it forms a carbonaceous residue known as char. This char is also self-supporting, although it is not flexible. That is, when the felt is positioned in a construction joint and subjected to fire, the resultant char will remain in position and can support its own weight. It will generally not crumble or disintegrate under the conditions typically experienced in a fire. This does not mean that it will not crumble under heavy pressure; rather, to demonstrate its rigidity, the char will typically resist penetration resulting from a pencil under light hand pressure. Thus, the char serves to protect against the transfer of heat.

The flexible fire barrier felt of the present invention is generally useful in applications in which endothermic or intumescent fire retardant mats are commonly used, such as in window and door edges, in dynamic joints, and as insulation for pipe wraps and electrical cable trays. It is particularly useful when used as a fire retardant barrier in a dynamic joint. Dynamic joints are generally linear openings in a building, such as joints within floors and walls or between floors and walls, which are designed to allow for building movement. Dynamic joints are often referred to in the trade as "construction joints," "soft joints," "expansion joints," and "seismic joints." A common type of a dynamic joint, known as an "exterior wall gap," is present between exterior walls or curtain walls and the structural elements of a building. Typically, the felt, which can be in the form of a mat is draped across an opening between, for example, a wall and a floor, with sufficient slack to allow for slight movement in the joint. It may be used in combination with mineral wool insulation or other insulation materials, and may be held in place with pins, clamps, or adhesives. A preferred method of installing a fire retardant mat in a curtain wall using adhesive is described in commonly assigned, co-pending U.S. Ser. No. 08/391,939, "Fire Barrier Protected Dynamic Joint" filed on Feb. 21, 1995, now U.S. Pat. No. 5,765,332 which is incorporated herein by reference.

The fire barrier felt includes a heat absorbing compound, an optional phosphorus-containing compound, organic fibers having pendant hydroxyl groups, and an organic polymeric binder. For each of these components, one or more materials can be used. That is, a felt can include one or more heat absorbing compounds, one or more different types of organic fibers, etc. The heat absorbing compound provides insulating characteristics to the material. That is, the material is a thermal insulator, both before and after exposure to the effects of a fire. Preferably, the heat absorbing compound is selected from the group consisting of an intumescent compound, an endothermic compound, and mixtures thereof.

As used herein, an endothermic compound is one that absorbs heat by releasing water of hydration. These compounds contribute to the insulating characteristics of the fire barrier felt by absorbing thermal energy and releasing gases (such as water vapor) at a temperature above room temperature (i.e., 25°–30° C.). Preferably, the gases are released at a temperature below about 500° C. Thus, compounds containing water molecules (i.e., water of hydration) are suitable for use in the practice of this invention. Preferably, these compounds are in a form that is insoluble in water or only slightly soluble in water. That is, preferably they exhibit no more than about 5% solubility in water at about 25° C. and, more preferably, no more than about 10% solubility in water at about 50° C. As used herein, all solubility percentages are weight percentages based on the weight of the material (fully hydrated if the molecules contain water of hydration) and the total weight of the solution. Suitable endothermic compounds include, but are not limited to, alumina trihydrate ($Al_2O_3 \cdot 3H_2O$), hydrated zinc borate ($ZnB_2O_4 \cdot 6H_2O$), calcium sulfate ($CaSO_4 \cdot 2H_2O$; also known as gypsum), magnesium ammonium phosphate ($MgNH_4PO_4 \cdot 6H_2O$), magnesium hydroxide ($Mg(OH)_2$). The magnesium ammonium phosphate is preferred because it can serve a dual purpose of acting as an endothermic compound and providing a source of phosphorus. Another preferred endothermic material is alumina trihydrate, such as that commercially available under the trade designation "SOLEM SB-36" from J.M. Huber Corp., Solem Div., Norcross, Ga. This latter material is available as a powder with 90% of the particles having a diameter of about 6–60 micrometers.

As stated above, an intumescent compound is one that expands to at least about two times its original volume upon heating. During heating, the intumescent compound expands the felt and generates gas. Typically, this occurs at a temperature above about 100° C. An intumescent compound contributes to the insulating ability of the fire barrier felt by increasing the total volume, absorbing some thermal energy during a fire, and creating a generally tight seal around construction elements. When the fire barrier felt of the present invention includes an intumescent compound, it is particularly suitable for use with a firestop clamping assembly which surrounds pipes and other types of through-penetrations in walls and ceilings. Such a firestop assembly is described, for example, in U.S. Pat. No. 5,103,609 (Thoreson et al.), which is incorporated herein by reference and describes one or more pieces of a fire barrier felt wrapped around a pipe and held in place by a metal clamping assembly. When heated, such as when exposed to the heat and flames of a fire, the fire barrier felt expands to fill gaps, such as the gap created if the pipe collapses. Typically, when an intumescent material is used, the fire barrier felt of the present invention expands to at least about three times its original volume, and preferably, to at least about nine times its original volume.

Suitable intumescent compounds are substantially insoluble in water. That is, preferably, they do not exhibit more than about 5 wt-% solubility at about 25° C., and, more preferably, not more than about 10 wt-% solubility at about 50° C. Examples of such compounds include intercalated graphite, hydrated alkali metal silicates, vermiculite, perlite, and mica. A preferred intumescent graphite material is an acid intercalated graphite having an acid-neutralized surface commercially available under the trade designation "GRAPHITE IG-338-50" from UCAR Carbon of Cleveland, Ohio. A preferred intumescent compound is a granular hydrated alkali metal silicate intumescent composition commercially available under the trade designation "EXPANTROL 4BW" from the 3M Company of St. Paul, Minn.

Typically, the heat absorbing compound (or a mixture of heat absorbing compounds) is present in the flexible fire barrier felt in an amount of at least about 10 wt-%, based on the total dry weight of the felt. Felts with less than this amount are generally not effective for this use as they either do not expand sufficiently or do not absorb enough heat to act as an effective thermal barrier. Preferably, the heat absorbing compound is present in an amount of at least about 20 wt-%, and more preferably, at least about 25 wt-%. Typically, the heat absorbing compound is present in the flexible fire barrier felt in an amount of no greater than about 70 wt-%. Felts with more than this amount typically are not sufficiently flexible for use in dynamic joint applications.

The optional phosphorus-containing compound (or a mixture of such compounds) is present in the flexible fire barrier felt of the present invention to provide flame retarding characteristics to the material. Preferably, the flame retarding phosphorus-containing compound is substantially water insoluble. That is, preferred materials are not more than about 5% soluble at about 25° C., and, more preferably, not more than about 10% soluble at about 50° C. Suitable flame retarding phosphorus-containing compounds include phosphates, such as magnesium ammonium phosphate, polymer-encapsulated ammonium polyphosphate, and organic phosphate oils. Red phosphorus may also be suitable for use in this invention. Phosphate compounds are commercially available or can be readily synthesized by techniques known in the art. For example, magnesium ammonium phosphate can be prepared by the reaction of magnesium chloride, dihydrogen ammonium phosphate, and magnesium hydroxide in an aqueous solution. Magnesium ammonium phosphate also is commercially available under the trade designation "BUDIT 370" from Cometals Inc. of New York, N.Y. A preferred phosphate-containing compound is melamine formaldehyde encapsulated ammonium polyphosphate, which is commercially available under the trade designation "HOSTAFLAM 422" from Hoechst Celanese of Summit, N.J. (containing 31 wt-% phosphorus±5%). A preferred organic phosphate oil (e.g., a phosphate ester) is commercially available under the trade designation "SANITIZER 141" from Monsanto of St. Louis, Mo. (containing 2.7–3.0 wt-% phosphorus).

Typically, phosphorus is present in the fire barrier felt in an amount of at least about 0.3 wt-% phosphorus in the felt (calculated as the weight percent of phosphorus provided by a phosphorus-containing compound), based on the total dry weight of the felt. Felts with less than this amount tend to decompose too rapidly when exposed to a flame. Preferably, phosphorus is present in the felt in an amount of at least about 0.5 wt-%, and more preferably, at least about 0.7 wt-%. Typically, the phosphorus is present in the fire barrier felt in an amount of no greater than about 3 wt-%. Felts with more than this amount are generally not cost effective. As stated previously, this amount of phosphorus is provided by a phosphorus-containing compound, which can be the heat absorbing compound, which is present in the felt in an amount sufficient to provide the desired level of phosphorus.

Organic fibers having pendant hydroxyl groups are present in the flexible fire barrier felt of the present invention to strengthen the felt and to improve its flexibility. The fibers also contribute to the structural integrity of the charred material after exposure to heat. The organic fibers having pendant hydroxyl groups are preferably cellulosic fibers. Suitable cellulosic fibers include cotton, linen, hemp, wood pulp, and rayon fibers. Preferably, the cellulosic fibers are at least about 0.63 cm long, and, more preferably, they are at least about 1.25 cm long. Preferred cellulosic fibers are rayon fibers commercially available under the trade designations "RAYON 3D ½" and "RAYON 3D ¼" from MiniFiber, Inc. of Johnson City, Tenn. These fibers are provided as chopped fibers in 1.25 cm and 0.63 cm lengths. The "D" designation refers to the denier of the fiber.

Typically, the organic fibers having pendant hydroxyl groups, preferably cellulosic fibers, (or mixtures of different types of such fibers) are present in the fire barrier felt in an amount of at least about 5 wt-%, based on the total dry weight of the felt. Felts with less than this amount tend to lack sufficient tensile strength and flexibility, and are less self-supporting before and after exposure to fire. Preferably, they are present in an amount of at least about 8 wt-%. Typically, the cellulosic fibers are present in the fire barrier material in an amount of no greater than about 75 wt-%.

Felts with more than this amount generally tend to be too weak, lacking cohesiveness and flexible strength. Preferably, they are present in an amount of no greater than about 30 wt-%.

Although not being bound by theory, it is believed that the organic fibers having pendant hydroxyl groups, and particularly cellulosic fibers, in conjunction with the phosphorus-containing compound, assist in stabilizing char formation when the material is subjected to heat. Again, although not being bound by theory, it is believed that this is because phosphorus interacts with the pendant hydroxyl groups on the surface of the fibers and, in the presence of the polymeric binder, creates a firm carbonaceous network upon exposure to heat. The felt of the present invention can include other organic fibers that do not have pendant hydroxyl groups, such as polyethylene and polypropylene fibers. These may be included to modify the strength of the felt or modify the hand of the felt and are further discussed below with respect to fillers.

Although other fire protection materials include phosphorus-containing compounds and cellulose (see, e.g., U.S. Pat. Nos. 5,232,976 (Horacek et al.) and 5,175,197 (Gestner et al.)), the cellulose is in the form of powder used to thicken a caulk composition. In the felt of this invention, it is important that the cellulose be in the form of fibers because fibers are capable of forming internal structures (e.g., networks) that contribute to the strength and resiliency of the felt even after exposure to heat.

Inorganic fibers may be desirable to include in the felt because they contribute to the high temperature durability of the felt, but are by their nature brittle, which tends to reduce the flexibility of the felt. However, inorganic fibers (such as glass and ceramic fibers) tend to add fire resistance to the felt and strength to the char. Thus, it is preferable to add at least about 5 wt-%, based on the total dry weight of the felts, of inorganic fibers to the felt. Felts with less than this amount are generally less useful at temperatures exceeding 1000° C. More preferably, they are present in an amount of at least about 10 wt-% and may be present in amounts up to about 75 wt-%. As with all other components of the felt, one or more different types of inorganic fibers can be used.

The binder is an organic polymeric material which preferably has elastomeric properties. That is, the polymer has rubber-like properties, such as conformability and stretch. The binder can be either a thermoplastic polymer or a thermoset polymer. Preferably, the binder is a latex, i.e., a polymer that is dispersed or dispersible in water. Such polymeric binders are commercially available either as an aqueous dispersion or as powders or liquids, which can then be dispersed in water before use. Suitable polymers include acrylates, natural rubbers, styrene butadiene copolymers, butadiene acrylonitrile copolymers, urethane elastomers, polyvinylidene fluoride, polyamide, polyisoprene, polychloroprene, and polybutadiene. Preferred latex binders include an acrylate polymer, which is commercially available under the trade designation "RHOPLEX HA-8" from Rohm and Haas Co. of Philadelphia, Pa., and an ethylene/vinyl acetate/acrylate terpolymer, which is commercially available under the trade designation "AIRFLEX 600BP" from Air Products and Chemicals, Inc. of Allentown, Pa.

Typically, the organic polymeric binder is present in the fire barrier felt in an amount of at least about 10 wt-%, based on the total dry weight of the felt. Felts with less than this amount are generally not sufficiently flexible. Preferably, the organic polymeric binder is present in an amount of at least about 20 wt-%. Typically, the organic polymeric binder is present in the fire barrier material in an amount of no greater than about 50 wt-%. Preferably, it is present in an amount of no greater than about 25 wt-%.

Fillers can be used to add reinforcement, adjust the stiffness, or alter the handleability of the flexible fire barrier felt of the present invention. Fillers include, but are not limited to, fumed silica, clay, fly ash, perlite, vermiculite, glass powders (also known as glass frits), sodium aluminates, zinc borate, boric oxide, inorganic fibers (e.g., glass fibers, glass ceramic fibers, ceramic fibers, mineral fibers, and carbon fibers), and organic fibers (e.g., nylon fibers, thermoplastic polyethylene fibers, and polyester fibers). Some of the refractory materials, such as ceramic fibers, glass powders, as well as sodium aluminates, zinc borate, boric acid, and the like, may also serve an additional fire retardant purpose. Preferred fillers include glass fibers such as those commercially available under the trade designation "MICROFIBER 106/475," which is available from Schuller International, Defiance, Ohio, or ceramic fibers commercially available under the trade designation "FIBERFRAX 7000M," which is available from Carborundum of Niagara Falls, N.Y. Other suitable ceramic fibers are commercially available as "NEXTEL" ceramic fibers from the 3M Company of St. Paul, Minn. Preferably, like the cellulosic fibers, the inorganic fibers range in length from about 0.3 cm to about 2.5 cm, and more preferably, from about 0.63 cm to about 1.25 cm.

Other additives, such as colorants (e.g., $Fe_2O_3$), which may aid in product identification, fungicides, and bactericides, may be added to the fire barrier felt. Also defoamers, which are typically petroleum derivatives, may be added during the process of making the felt. Defoamers are used to minimize foaming and facilitate processing. Surfactants may also be used in the felt making process and typically are used to assist in incorporating all of the materials into the felt.

The fire barrier felt of the present invention is typically formed into a flexible mat. This mat can be made by using conventional wet-forming techniques typically used in the paper-making industry. These can include hand laid or machine laid techniques. For example, a handsheet mold, a Fourdrinier paper machine, or a rotoformer paper machine can be used to make a flexible mat. In addition to a wet-laid or paper-making method, various vacuum forming methods can be used to make three-dimensional, complex shapes, such as honeycombs or shells, as is known to those skilled in the art of vacuum forming.

Typically, a polymeric binder (as a latex) is mixed with the heat absorbing compound, an optional phosphorus-containing compound, and a surfactant to form a homogeneous suspension, referred to herein as a "premix." This premix can also contain other desired additives, but does not typically contain fibers, such as cellulosic, glass, ceramic, or mineral fibers. Because fibers are typically received from a supplier in the form of bundles, the fibers are not free-flowing. Therefore, it is desirable to individualize the fibers by subjecting them to high shear forces before adding all the fibers and the premix containing the polymer together. This is done by mixing the fibers in, for example, a blender with a large volume of water to form a slush. Sodium aluminate is typically added to the fiber slush to produce a high pH solution (typically ranging from about 8 to about 10). The sodium aluminate is washed away during processing and typically does not contribute to the final weight of the felt. The premix is then pumped into a container holding a "slush" of the fibers. Preferably, the mixing of the premix with the fiber slush is done at a controlled temperature, e.g., at about 45°–55° C. When the fiber slush and premix containing the polymer are mixed together, the mixture is at a basic pH, typically within a range of about 8–10. A pH change is preferably used to precipitate the suspension; however, other methods are available to precipitate the suspension. Such methods are known and used in the paper making industry. For acidifying the suspension, aluminum sulfate is typically used. It is believed that this causes precipitation of the polymer, heat absorbing compound, and optional phosphorus-containing compound onto the fibers, which aids in the felt making process. The aluminum sulfate washes away during processing and typically does not contribute to the final weight of the felt. A defoamer can be added at any point during the mixing process when it appears necessary to reduce the amount of foaming. Suitable defoamers include petroleum derivatives such as "FOAM-MASTER II" from Henkel of Ambler, Pa.

To make a felt, the mixture is cast onto a paper-making screen, such as a Fourdrinier screen, to remove excess water, pressed or blotted to remove as much water as possible, and then dried using a steam drum drier or conventional oven. It may be desirable during the casting process to add more defoaming agent; this is typically done by spraying some of the agent onto the felt. The felt can be made over a large range of thicknesses, depending upon the equipment used to make the felt. A typical felt ranges in thickness from about 0.15 cm to about 1.25 cm, and preferably about 0.32 cm to about 0.63 cm.

It may be desirable to laminate the fire barrier material to a restraining layer such as a metal foil (e.g., aluminum or steel foil), graphite foil, insulating blanket, or other fire barrier sheets. Lamination can be done, for example, by pressing two materials together at room temperature or by running them through laminating rollers (which typically use pressure and heat). Also, an adhesive can be used to laminate two layers together. Lamination is particularly desirable when the fire barrier material of the present invention contains an intumescent compound, because the laminated layer acts to control the direction of expansion of the material. Other materials useful as restraining layers are described in U.S. Pat. No. 4,467,577 (Licht), which is incorporated herein by reference, and include metal screen, paper, cardboard, and rubber or plastic sheets.

The fire barrier felt of the present invention can be used for sealing or isolating openings in building components, such as gaps between walls, cavities, interspaces, wall breaks, cable ducts, and the like. The felt may also be useful as heat insulation for roofs, walls, and floors, lining for metal panels and doors, and backing for fire retarding walls.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Hotside/Coldside Test

For fire testing, a dynamic joint assembly was built to simulate that used in a building. Referring to FIG. 1, dynamic joint assembly 10 included a 0.19 m$^3$ gas-fired furnace commercially available as a kiln from Olympic Kilns of Atlanta, Ga. (not shown), which was covered with 5 cm thick ceramic slab 11 having a 10.2 cm by 10.2 cm square opening 12. A 17.8 cm by 17.8 cm square felt test specimen 14 was centered over the top of the opening 12. One side of the felt test specimen 14 was covered with 0.05 mm thick aluminum foil tape 15. The foil side faced upward to the coldside. The edges of the test specimen 14 were held in place by a fire retardant caulk 16 commercially available under the trade designation "2000+ FIREBARRIER CAULK" from the 3M Company of St. Paul, Minn. This caulk also acted to keep the heat and flame on the hotside of felt test specimen 14. The temperature on the coldside was monitored using a 15.2 cm thermocouple pad (not shown) over thermocouple 18. The temperature on the hotside was monitored by the permanent furnace thermocouples as described in ASTM (American Society for Testing Materials) Test Method E119-88.

The test was run according to ASTM Test Method E119-88, entitled "Standard Test Methods for Fire Tests of Building Construction and Materials," which is incorporated herein by reference. This test was used to determine the difference in temperature between the hot and cold sides and to evaluate the duration for which these fire barrier materials contained a fire or retained structural integrity. The assembly was subjected to the temperature and time conditions shown in FIG. 1 of ASTM E119-88. Temperatures were recorded every minute.

Joint Fire Test

A construction joint was formed that simulated a 2 hour fire rated floor, according to ASTM Test Method E119-88. Referring to FIG. 2, to form construction joint test assembly 20, two concrete slabs 21 and 22 (198 cm long×73.7 cm wide×11.4 cm deep) were poured and cured. The concrete slabs were positioned on top of a 2.72 cubic meter floor furnace (not shown) built to ASTM Test Method E119-88 specifications. The joint 23 formed between the two slabs was 20.5 cm wide and 198 cm long. A 0.56 cm thick test specimen (felt) 24 was covered on one side with aluminum foil tape 25. For this test, the aluminum foil 25 was positioned to face the fire, or hotside. A ceramic cloth cover 29 was draped across the top of the opening to support the thermocouple 30 and positioned by weighting down the ends on top of the slabs 21 and 22 using weights 26 and 27. The felt 24 was adhered to the faces of the concrete slab by applying a silicone adhesive 28 commercially available as "3M FIRE BARRIER SEAL & BOND SILICONE" from the 3M Company of St. Paul, Minn. The adhesive was troweled onto the concrete faces at a thickness of about 0.16 cm, allowed to cure to a tacky consistency for about 15 minutes, and the felt was then pressed into place. This was allowed to cure for 24 hours before running the fire test.

Flex Test

To conduct flex testing, a commercially available flex tester was obtained from Arcon International of Lawrenceville, Ga. A sample of a fire barrier felt was tested according to ASTM Test Method E1399-91, entitled "Cyclic Movement and Measuring the Minimum and Maximum Joint Widths of Architectural Joint Systems," which is incorporated herein by reference, in a 15 cm wide joint. That is, the joint is flexed from 100% open to 100% closed, leaving a space such that the closed position is twice the thickness of the felt. This avoids compressing the felt. ASTM Test Method E1399-91 is used to evaluate compression and deflection characteristics of architectural joint systems, including fire barriers used in such joints. The results are reported in the number of flex cycles it takes to damage or break the felt, so it will no longer perform as an effective fire barrier.

Volume Expansion Test

A one inch diameter disk of the felt was punched out using a premade die. A simple expansion test was done to measure the expansion in only one direction for felts constrained to expand in one direction, since 95% of the expansion of these felts occurs in a direction normal to their surface, wherein $$\text{Expansion Ratio} = \frac{\text{thickness of charred disk}}{\text{thickness of initial disk}} \quad (1)$$

In the following examples, the component amounts are expressed by their weight in grams or kg; their dry weight percent, based on the total dry weight of the felt, follows in parentheses.

Example 1

This example describes the preparation of a felt containing an intumescent material. A premix was made by mixing together in a low shear blender (total volume: 151.4 liters) 68.0 kg of an acrylate latex (55% solilds, a terpolymer of ethylene-vinyl acetate-acrylate commercially available under the trade designation "AIRFLEX 600BP" from Air Products and Chemicals, Inc. of Allentown, Pa.), 18.1 kg (which provides 0.3 wt-% of phosphorus to the felt)) an organic phosphate (a phosphate ester (oil) commercially available under the trade designation "SANITIZER 141" from Monsanto Chemical Co. of St. Louis, Mo.), 0.5 kg of a surfactant (a sodium salt of polymeric carboxylic acid (30% active in solution) commercially available under the trade designation "TAMOL 850" from Rohm & Haas of Philadelphia, Pa.), and 15.1 kg of alumina trihydrate (commercially available under the trade designation "SOLEM SB 36" from Solem Manufacturing, J.J. Huber Corp. of Fairmount, Ga.). After stirring for about 10 minutes, 3.0 kg (which provides 0.6 wt-% phosphorus in the felt) of a second phosphorus compound (a melamine-coated organic phosphate commercially available under the trade designation "HOSTAFLAM 422" from Hoechst Celanese of Summit, N.J.), 53.1 kg of graphite (a sulfuric acid treated graphite flake with a pH neutralized surface commercially available under the trade designation "GRAPHITE IG-338-50" from UCAR Carbon Co. of Danbury, Conn.) and 37.8 liters of water were added to the initial mixture. This premix was stirred until ready to pump into another container holding a slush of fibers.

A high shear, large capacity blender was charged with about 3634 liters of water, 1.4 kg of a 32% sodium aluminate ($Na_2Al_2O_4$) aqueous solution (commercially available under the trade designation "NALCO 2372" from Nalco Chemical Co. of Naperville, Ill.), and 3.0 kg of fiberglass (a low melting glass fiber commercially available under the trade designation "MICROFIBER 106/475" from Schuller International of Defiance, Ohio). The fibers were mixed in the blender for about 30 seconds. Following this, 22.7 kg of ceramic fiber (a high temperature ceramic fiber commercially available under the trade designation "FIBERFRAX 7000M" from Carborundum of Niagara Falls, N.Y.) were added and mixed for 2 minutes. While this was mixing, 2.3 kg of 1.25 cm rayon fiber and 7.6 kg of 0.63 cm rayon fiber were sprinkled into the mixer. An additional 757 liters of water was used to rinse this mixture out of the blender while transferring to a larger container.

The fiber slush was pumped into a large vat and the premix containing the binder was pumped into the vat. The mixture was continually mixed to prevent settling. The temperature of the stirring mixture was held at about 50° C. (±5° C.). About 18 kg of a 25 wt-% aluminum sulfate ($Al_2(SO_4)_3 \cdot 14H_2O$) solution (commercially available under the trade designation "NALCO 7530" from Nalco Chemical Co. of Naperville, Ill.) was added to the diluted mixture with stirring.

The mixture was cast into felts using a conventional Fourdrinier paper-making machine employing a steam drum drier. To minimize foaming during casting into felts, about 25 mL of a defoaming agent (a petroleum derivative commercially available under the trade designation "FOAM-MASTER II" from Henkel of Ambler, Pa.) was added to the mixture over the course of mixing and during casting by adding as necessary from a spray bottle. The cast felt had a weight per unit area of about 40–80 grams per 3.7 square meters and a thickness ranging from about 0.28 cm to about 0.56 cm.

The resulting felt with a thickness of 0.29 cm was used in the "Hotside/Coldside Fire Test," described above and depicted in FIG. 1. There was a difference of about 426° C. between the hot and cold sides, indicating that the felt was a very effective barrier to heat. The temperature gradient reached equilibrium after about 15 minutes.

The felt, at a thickness of about 0.56 cm, was used in the "Joint Fire Test," described above and depicted in FIG. 2. This sample achieved a 1 hour fire rating per ASTM E119-88. The fire test ran for a total of 2 hours. The fire was stopped and the sample allowed to cool until it could be examined. The char remained in place and was still solid (i.e., it had not crumbled and remained an integral piece) at the end of the 2 hours.

Another sample of the felt was subjected to 5000 flex cycles according to the "Flex Test" described above. This sample passed the test. By this it is meant that the felt did not fall apart (e.g., crack) after 5000 flex cycles. Expansion tests were done using 2.5 cm diameter disks which were die cut from a felt. Thirty disks were tested by placing in an oven at 350° C. for 5 minutes. The volume of expansion was calculated using equation (1) in the "Volume Expansion Test" described above. The volume of expansion was about 8–13 times the original (unexpanded) volume.

The felt of Example 1 was also used in a PVC pipe firestop apparatus, such as that described in U.S. Pat. No. 5,103,609 (Thoreson et al.), which is incorporated herein by reference. Sufficient layers of the felt were wrapped around the pipe to create a 1.89 cm thick layer. After about 8 minutes of exposure to fire, the felt expanded and closed off the pipe and produced a hard char which was difficult to dislodge after a two hour E119 test.

Example 2

This example describes the preparation of a felt containing an endothermic material. A premix was made as described in Example 1 by mixing together in a low shear blender 90.7 kg of "AIRFLEX 600BP" acrylate latex, 18.1 kg (which provided 0.2 wt-% phosphorus to the felt) of "SANITIZER 141" organic phosphate, and 0.5 kg of "TAMOL 850" surfactant. While this was mixing, 3.6 kg (which provided 0.5 wt-% phosphorus to the felt) of "HOSTAFLAM 422" organic phosphate and 120.6 kg of "SOLEM SB 36" alumina trihydrate were added with stirring. This mixture formed a smooth paste. About 38 liters of water were added to reach a pourable consistency. This premix was allowed to stir and held until ready to pump into another container holding a slush of fibers.

A high shear, large capacity blender was charged with about 3634 liters of water, 1.8 kg of "NALCO 2372" sodium aluminate solution, and 2.5 kg of "MICROFIBER 106/475"

glass fiber. The fibers were mixed in the blender for about 30 seconds. Then, 22.7 kg of ceramic fiber (high temperature ceramic fiber commercially available under the trade designation "FIBERFRAX 7000M") were added and mixed for 2 minutes. While this was mixing, 2.5 kg of 1.25 cm rayon fiber (commercially available under the trade designation "RAYON 3D ½" from Mini Fiber, Inc. of Johnson City, Tenn.) and 10.7 kg of 0.63 cm rayon fiber (commercially available under the trade designation "RAYON 3D ¼" from Mini Fiber, Inc. of Johnson City, Tenn.) were sprinkled into the mixer.

The fiber slush was pumped into a large vat and the premix containing the binder was pumped into the vat. The mixture was continually mixed to prevent settling. The temperature of the stirring mixture was held to 50° C. (±5° C.). About 20.84 kg of "NALCO 7530" 25 wt-% aluminum sulfate ($Al_2(SO_4)_3 \cdot 14H_2O$) solution was added to the diluted mixture with stirring. An additional 757 liters of water was used to rinse this mixture out of the blender while transferring to a larger container.

The mixture was cast into felts using a conventional Fourdrinier paper-making machine employing a steam drum drier. To minimize foaming during casting into felts, about 25 mL of "FOAMMASTER II" defoaming agent was added to the mixture as necessary during mixing and during casting. The cast felt had a weight per unit area of about 15–25 grams per 3.7 square meters and a thickness ranging from about 0.13 cm to about 0.38 cm.

The resulting felt, at a 0.25 cm thickness, was used in the "Hotside/Coldside Fire Test," described above and depicted in FIG. 1. There was a difference of about 426° C. between the hot and cold sides, after reaching equilibrium, indicating that the felt was a very effective barrier to heat. After 15 minutes, the coldside temperature was 340° C. and at 1 hour the coldside temperature was 591° C.

A similar test was run using one layer of the felt, which was 0.29 cm thick, from Example 1 on the hotside with 2 layers of the felt, which was 0.25 cm thick, from Example 2 on the coldside. This layered system reached 96° C. on the coldside in 30 minutes and 255° C. in 60 minutes.

Example 3

This example describes the preparation of a sample of another intumescent fire barrier felt. A premix was prepared by mixing 45 grams of "AIRFLEX 600BP" acrylate latex, 12 grams (which provided 0.3 wt-% phosphorus to the felt) of "SANITIZER 141" organic phosphate, 6 drops of "TAMOL 850" surfactant, 2 grams (which provided 0.6 wt-% of phosphorus to the felt) of an organic phosphate (a melamine-coated organic phosphate commercially available under the trade designation "HOSTAFLAM 422" from Hoechst Celanese of Summit, N.J.), and 35 grams (35.8 wt-%) of "GRAPHITE IG-338-50" graphite by hand in a beaker until homogeneous. About 50 mL of deionized water were worked in until the mixture was smooth and pourable.

A fiber mixture was prepared by combining 23.5 grams (24.5 wt-%) of "RAYON 3D ¼" rayon fiber (0.63 cm long) and 2 liters of deionized water in a blender. Ten drops of "NALCO 2372" sodium aluminate solution were added. The temperature was held at 50° C. and the material was mixed at high speed for 6 seconds to individualize the fibers. The fiber slush was poured into a 5 liter beaker. Agitation was provided by a stirring rod powered by a pneumatic mixer to prevent settling. The mixture containing the latex was poured into this fiber slush and 3 drops of "FOAMMASTER II" defoamer was added. Over a period of about 2 minutes, 25 grams of "NALCO 7530" 25 wt-% aluminum sulfate was poured into the mixture. The agitation was continued for a few seconds until the latex was visibly precipitated onto the fibers. That is, the cloudiness of the suspension disappeared and the fibers could be seen to flocculate. The mixture was transferred to a 20.3 cm×20.3 cm papermaker (commercially available as a Handsheet Maker from Williams Apparatus Co. of Watertown, N.Y.) and drained to remove the water. The resultant soft felt was then pressed with blotter paper at 420 Pascals for 5 minutes to remove as much water as possible. The felt was dried for 60 minutes in a lab oven at 128° C. The felt was 0.3 cm thick.

Three samples were cut into 2.5 cm diameter coupons and tested for expansion at 350° C., according to equation (1) in the "Volume Expansion Test." The expansion for the three samples was 9–10 times the original volume. This felt passed the "Flex Test" as described above at 5000 flex cycles.

Example 4

This example describes the preparation of a felt. A premix was prepared by mixing 67.5 grams of "AIRFLEX 600BP" acrylate latex, 5 grams of "SOLEM SB36" alumina trihydrate, 5 grams (which provided 1.6 wt-% phosphorus to the felt) of "HOSTAFLAM 422" organic phosphate, 6 drops of "TAMOL 850" surfactant, and 35 grams of "GRAPHITE IG-338-50" graphite by hand in a beaker until homogeneous. About 50 mL of deionized water were then worked into the mixture until it was smooth and pourable.

A fiber slush was prepared by combining 2.5 grams of "RAYON 3D ¼" rayon fiber (0.63 cm long), 0.75 gram of "RAYON 3D ½" rayon fiber (1.25 cm long), 1.0 gram of glass fibers (commercially available under the trade designation "MICROFIBER 106/475" and 7.5 grams of "FIBERFRAX 7000M" ceramic fiber with 2 liters of deionized water in a blender. Ten drops of "NALCO 2372" sodium aluminate solution were added. The temperature was held to 50° C. and the material was mixed at high speed for 6 seconds to individualize the fibers. The fiber slush was poured into a 5 liter beaker. Agitation was provided by a stirring rod powered by a pnematic mixer to prevent settling.

The mixture containing the latex was poured into the fiber slush and 6 drops of "FOAMMASTER II" defoamer was added. Over a two minute period, 25 grams of "NALCO 7530" 25 wt-% aluminum sulfate was poured into the mixture. The agitation was continued for a few seconds until the latex was visibly precipitated onto the fibers. That is, the cloudiness of the suspension disappeared and the fibers could be seen to flocculate. The mixture was transferred to a 20.3 cm×20.3 cm papermaker (commercially available as a Handsheet Maker from Williams Apparatus Co. of Watertown, N.Y.) and drained to remove the water. The resultant soft felt was then pressed with blotter paper at 420 Pascals for 5 minutes to remove as much water as possible. The felt was dried for 60 minutes in a lab oven at 128° C. The felt was 0.28 cm thick.

Three 2.5 cm diameter coupons were cut from the dried felt and tested for expansion at 350° C. according to equation (1) in the "Volume Expansion Test." The average expansion of the three samples was 9.4 times the original volume. The felt passed 2000 flex cycles of the "Flex Test."

Example 5

A premix was prepared by combining 30 grams (16.5 wt-%) of "AIRFLEX 600BP" acrylate latex, 9 grams (which provided 0.3 wt-% phosphorus to the felt) of "SANITIZER 141" organic phosphate, 6 drops of "TAMOL 850" surfactant, 2 grams (which provided 0.8 wt-% phosphorus to the felt) of "HOSTAFLAM 422" organic phosphate, 30 grams (38.8 wt-%) of magnesium ammonium phosphate (a low temperature endothermic powder of the formula $MgNH_4PO_3.8H_2O$ commercially available under the trade designation "BUDIT 370" from Budenheim Chemicals/Cometals, Inc. of New York, N.Y.) and mixing by hand in a beaker until homogeneous. About 175 mL of deionized water were worked in until the mixture was smooth and pourable.

A fiber slush was prepared by combining 1.25 grams of "MICROFIBER 106/475" glass fiber, 11.25 grams of "FIBERFRAX 7000M" ceramic fiber, 5.25 grams of "RAYON 3D ¼" rayon fiber (0.63 cm long) and 1.25 grams of "RAYON 3D ½" rayon fiber (1.25 cm) with 2 liters of deionized water in a blender. Ten drops of "NALCO 2372" sodium aluminate solution were added. The temperature was held at 50° C. and the material was mixed at high speed for 6 seconds to individualize the fibers. The fiber slush was poured into a 5 liter beaker. Agitation was provided by stirring rod powered by a pneumatic mixer to prevent settling.

The premix containing the latex was poured into the fiber slush and 3 drops of "FOAMMASTER" defoamer was added. Over a two minute period, 50 grams of "NALCO 7530" 25 wt-% aluminum sulfate was poured into the mixture. The agitation was continued for a few seconds until the latex was visibly precipitated onto the fibers. The mixture was transferred to the papermaker used in Example 3 and drained to remove the water. The resultant soft felt was then pressed with blotter paper at 420 Pascals for 5 minutes to remove water. The felt was dried for 60 minutes in a lab oven at 128° C.

Two layers of the resulting 0.32 cm thick felt were used in a "Hotside/Coldside Fire Test," as described above and depicted in FIG. 1. These two layers were placed over a 0.28 cm thick felt made according to Example 1. A piece of 0.05 mm thick aluminum foil tape was placed over the top layer. All layers were sealed together at the edges with a fire retardant caulk (commercially available as "2000+ FIRE-BARRIER CAULK" from the 3M Company of St. Paul, Minn.). The thermocouple on the coldside showed a significant leveling off of the temperature rise above about 149° C. corresponding to the endothermic release of water associated with the magnesium ammonium phosphate. After 30 minutes the temperature on the coldside of the felt was 224° C. and at 60 minutes it was 342° C.

The felt was subjected to a 5000 flex cycles according to the "Flex Test" described above and passed. Thermal gravimetric analysis of the felt showed weight loss peaks of about 100° C. and about 300° C. corresponding to loss of water from magnesium ammonium phosphate.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A flexible fire barrier felt comprising:
   (a) at least 10 wt-% of an organic polymeric binder;
   (b) at least about 5 wt-% of organic fibers having pendant hydroxyl groups; and
   (c) at least about 10 wt-% of a heat absorbing compound; wherein the felt contains at least about 0.3 wt-% phosphorus, as provided by a phosphorus-containing compound; and wherein all weight percents are based on the total dry weight of the felt.

2. The flexible fire barrier felt of claim 1 wherein the heat absorbing compound is an intumescent compound or an endothermic compound.

3. The flexible fire barrier felt of claim 2 wherein the endothermic compound is selected from the group consisting of alumina trihydrate, magnesium ammonium phosphate, zinc borate, gypsum, magnesium hydroxide, and combinations thereof.

4. The flexible fire barrier felt of claim 2 wherein the intumescent compound is selected from the group consisting of intercalated graphite, mica, perlite, vermiculite, hydrated sodium silicate, and combinations thereof.

5. The flexible fire barrier felt of claim 1 wherein the organic fibers having pendant hydroxyl groups are cellulosic fibers.

6. The flexible fire barrier felt of claim 5 wherein the cellulosic fibers are selected from the group consisting of cotton, linen, hemp, wood pulp, rayon fibers, and combinations thereof.

7. The flexible fire barrier felt of claim 1 further comprising inorganic fibers.

8. The flexible fire barrier felt of claim 1 wherein the heat absorbing compound is a phosphorus-containing compound.

9. The flexible fire barrier felt of claim 8 wherein all of the at least about 0.3 wt-% phosphorus is provided by the heat absorbing phosphorus-containing compound.

10. The flexible fire barrier felt of claim 9 wherein the heat absorbing compound is magnesium ammonium phosphate.

11. A flexible fire barrier felt comprising:
   (a) at least 10% to about 50 wt-% of an organic polymeric binder;
   (b) about 5–75 wt-% of cellulosic fibers; and
   (c) about 10–70 wt-% of a heat absorbing compound; wherein the felt contains about 0.3–3 wt-% phosphorus, as provided by a phosphorus-containing compound; and wherein all weight percents are based on the total dry weight of the felt.

12. The flexible fire barrier felt of claim 11 wherein the heat absorbing compound is a phosphate.

13. The flexible fire barrier felt of claim 12 further comprising a phosphorus-containing compound distinct from the heat absorbing compound.

14. The flexible fire barrier felt of claim 11 further comprising inorganic fibers.

15. The flexible fire barrier felt of claim 11 wherein the heat absorbing compound is an intumescent compound or an endothermic compound.

16. The flexible fire barrier felt of claim 11 comprising:
   (a) at least 10% to about 50 wt-% of an organic polymeric binder;
   (b) about 5–75 wt-% of cellulosic fibers; and
   (c) about 10–70 wt-% of a non-phosphorus-containing heat absorbing compound; and
   (d) a sufficient amount of a phosphorus-containing compound to provide a felt containing about 0.3–3 wt-% phosphorus.

* * * * *

UNITED STATES PATENT AND TRADEMARK OFFICE
CERTIFICATE OF CORRECTION

PATENT NO.: 5,830,319

DATED: November 3, 1998

INVENTOR(S): Heather V. Landin

It is certified that error appears in the above-identified patent and that said Letters Patent is hereby corrected as shown below:

Col. 12, lines 13-14, "3.7 square meters" should read --154.8 square centimeters--.

Col. 13, line 27, "3.7 square meters" should read --154.8 square centimeters--.

Signed and Sealed this

Eighth Day of February, 2000

Attest:

Q. TODD DICKINSON

Attesting Officer

Commissioner of Patents and Trademarks